United States Patent
Reichart et al.

(10) Patent No.: US 10,724,882 B2
(45) Date of Patent: Jul. 28, 2020

(54) THERMAL FLOWMETER AND METHOD HAVING A SELF-HEATED ELEMENT CONTROLLED TO OPERATE DIFFERENTLY UNDER HIGH AND LOW PHASES OF SQUARE WAVE SIGNAL

(71) Applicant: IFM ELECTRONIC GMBH, Essen (DE)

(72) Inventors: Walter Reichart, Fronreute (DE); Markus Körber, Immenstaad (DE); Christian Kreisel, Neukirch (DE); Ralf Kriesen, Amtzell (DE)

(73) Assignee: IFM ELECTRONIC GMBH, Essen (DE)

( * ) Notice: Subject to any disclaimer, the term of this patent is extended or adjusted under 35 U.S.C. 154(b) by 189 days.

(21) Appl. No.: 15/776,623

(22) PCT Filed: Nov. 24, 2016

(86) PCT No.: PCT/EP2016/078671
§ 371 (c)(1),
(2) Date: May 16, 2018

(87) PCT Pub. No.: WO2017/089459
PCT Pub. Date: Jun. 1, 2017

(65) Prior Publication Data
US 2018/0348031 A1 Dec. 6, 2018

(30) Foreign Application Priority Data
Nov. 24, 2015 (DE) .................. 10 2015 223 224

(51) Int. Cl.
*G01F 1/69* (2006.01)
*G01F 1/698* (2006.01)
*G01F 1/699* (2006.01)

(52) U.S. Cl.
CPC ............ *G01F 1/6986* (2013.01); *G01F 1/698* (2013.01); *G01F 1/699* (2013.01)

(58) Field of Classification Search
None
See application file for complete search history.

(56) References Cited

U.S. PATENT DOCUMENTS

| | | | | |
|---|---|---|---|---|
| 3,803,913 A | * | 4/1974 | Tracer ....................... | G01F 1/68 73/204.14 |
| 4,335,605 A | * | 6/1982 | Boyd ..................... | G01F 1/6986 377/21 |

(Continued)

FOREIGN PATENT DOCUMENTS

| | | |
|---|---|---|
| DE | 102004055101 B4 | 11/2010 |
| EP | 0206215 A1 | 12/1986 |
| WO | WO-2014076419 A1 | 5/2014 |

OTHER PUBLICATIONS

Bailey, J. L. et al.: "Evaluation of the performance characteristics of a thermal transient anemometer", Experiments in Fluids, Springer, Heidelberg, DE, vol. 15, No. 1, Jun. 1, 1993, (Jun. 1, 1993), pp. 10-16, XP000384877, ISSN: 0723-4864, DOI: 10.1007/BF00195590.

(Continued)

*Primary Examiner* — Harshad R Patel
(74) *Attorney, Agent, or Firm* — Harness, Dickey & Pierce, P.L.C.

(57) ABSTRACT

A thermal flowmeter comprises a heating element thermally coupled to a flowing medium, a first temperature sensor and second temperature sensor. The first temperature sensor detects a flowing medium temperature in a region not affected by the heating element. The second temperature sensor detects a temperature of the heating element and also serves as a heating element. A control unit controls heating power of the heating element based on the difference (Continued)

Figure 1:
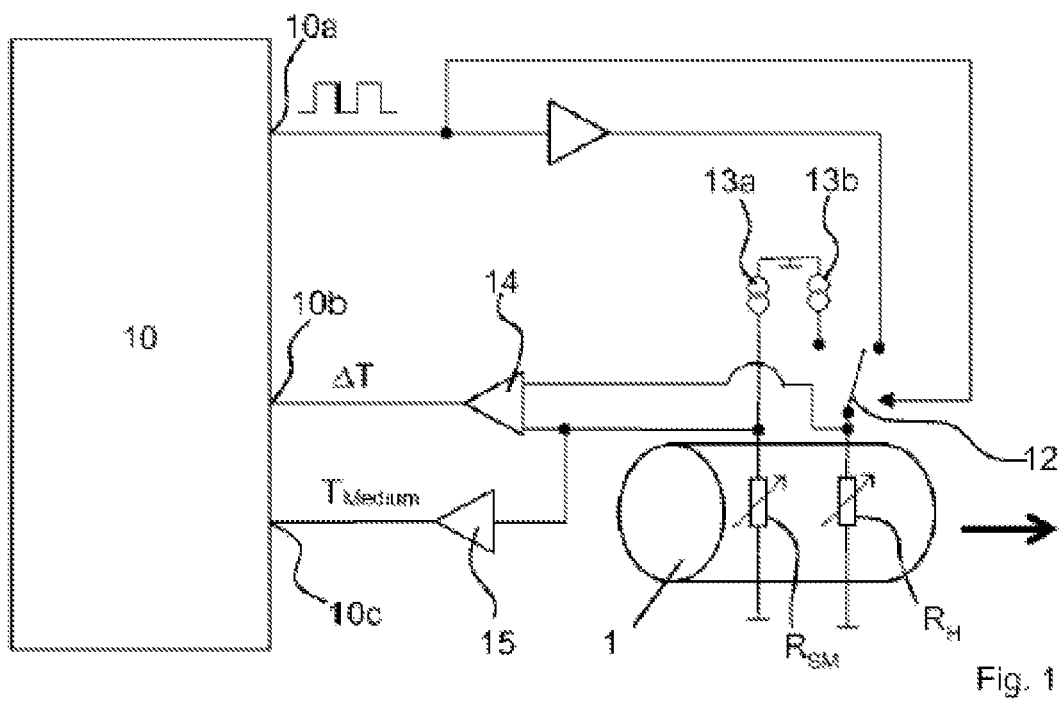

between the detected temperatures at a predetermined time. The control unit provides a square wave signal to the second temperature sensor so that in a high phase it acts as heating element and in a low phase as a temperature sensor.

10 Claims, 1 Drawing Sheet

(56) References Cited

U.S. PATENT DOCUMENTS

| | | | | |
|---|---|---|---|---|
| 4,885,937 A | * | 12/1989 | Tanaka | G01F 1/6845 |
| | | | | 73/170.12 |
| 4,918,995 A | * | 4/1990 | Pearman | G01D 4/004 |
| | | | | 73/204.11 |
| 5,072,614 A | * | 12/1991 | Hisanaga | G01D 3/0365 |
| | | | | 73/204.19 |
| 5,218,866 A | * | 6/1993 | Phillips | G01F 1/68 |
| | | | | 73/170.12 |
| 5,423,210 A | * | 6/1995 | Uchiyama | F02D 41/187 |
| | | | | 73/204.15 |
| 5,708,585 A | * | 1/1998 | Kushion | G01F 1/692 |
| | | | | 422/51 |
| 6,453,739 B1 | | 9/2002 | Saikalis et al. | |
| 7,387,022 B1 | | 6/2008 | Korniyenko et al. | |
| 2001/0027684 A1 | * | 10/2001 | Lotters | G01F 1/699 |
| | | | | 73/204.27 |
| 2018/0058892 A1 | * | 3/2018 | Becke | G01F 1/692 |

OTHER PUBLICATIONS

Gunderlach, V. et al.: "Moderne Prozessmesstechnik", Springer-Verlag Berlin Heidelberg, 1999, p. 10, ISBN: 978-3-540-63225-2, DOI: 10.1007/978-3-642-58364-3.

* cited by examiner

THERMAL FLOWMETER AND METHOD HAVING A SELF-HEATED ELEMENT CONTROLLED TO OPERATE DIFFERENTLY UNDER HIGH AND LOW PHASES OF SQUARE WAVE SIGNAL

CROSS-REFERENCE TO RELATED APPLICATIONS

This application is a National Stage of International Application No. PCT/EP2016/078671, filed on Nov. 24, 2016, and published in German as WO2017/089459 A1 on Jun. 1, 2017. This application claims the priority to German Patent Application No. 10 2015 223 224.7, filed on Nov. 24, 2015. The entire disclosures of the above applications are incorporated herein by reference.

FIELD

The disclosure relates to a thermal flowmeter for use in process measuring technology at non-constant medium temperatures as well as a method for operating such a flowmeter.

Flowmeters of the aforementioned type, also referred to as calorimetric flowmeters, detect the flow rate of gaseous or liquid media and have long been known, for example, from the German patent DE 10 2004 055 101. They work according to the calorimetric principle, in which temperature changes due to the heat transfer occurring depending on the flow rate can be determined. According to King's Law there is a dependency between the heating power required and the temperature difference between the sensor element and the medium and the flow rate. Due to this law, the flow rate can be determined.

BACKGROUND

This section provides background information related to the present disclosure which is not necessarily prior art.

There are placed requirements on devices of the process measuring technology, which in several respects go beyond those of other measuring devices. These include the use over months and years in a rough process environment as uninterruptedly as possible, moreover simple and standardized exchange of information with the target systems (controllers, process control systems, etc.) as well as simple commissioning and maintenance (see V. Gundelach, L. Litz "Moderne Prozessmesstechnik", 1999, p. 10). The process environment in which such a flowmeter operates is characterized in particular by its use at non-constant medium temperatures. It is therefore necessary to separate from the measured temperature difference between the sensor element and the medium that portion which results from the changed medium temperature and thus not by a changed heat dissipation due to a varying flow rate.

In contrast, measuring devices requiring the presence of a constant ambient temperature, such as a hot wire probe, are not applicable under the conditions mentioned. By way of example, reference is made to U.S. Pat. No. 6,453,739 B1. For these measuring devices a changed flow rate of the air stream as the sole cause for the detected heating or cooling of the heating element or hot wire can be assumed only at a constant ambient temperature.

In process measuring technology thermal flowmeters generally use a differential temperature measurement. A first measuring element generates a local temperature increase and measures the actual measuring temperature, wherein the measuring temperature results from the heating power of the measuring element, the temperature of the flowing medium and the flow-dependent heat transport capacity of the flowing medium. Furthermore, often a second measuring element measures a reference temperature. According to their function, the first measuring element is often referred to as a heating element and the second measuring element as a temperature element.

Typical applications are systems with two spatially separated measuring points for detecting the medium and the heating element temperature. Here, moreover, a distinction must be made between systems with constant heating power, in which the measured variable is the overtemperature, and systems with constant or regulated overtemperature, in which the measured variable is the heating power or a quantity derived therefrom. In the following, the disclosure is based on overtemperature-controlled calorimetric flowmeters.

Overtemperature-controlled calorimetric flow monitors are available as systems with two measuring elements—wherein one measuring element simultaneously serves as a heating element and a temperature sensor—and systems with two measuring elements and a separate heating element. The control in systems with only two measuring elements, as is the case, for example, in the abovementioned patent DE 10 2004 055101, is implemented analogous in that the target value for the overtemperature to be regulated depends on the equipment of a measuring bridge or the corresponding resistance values. The supply voltage of the bridge is then controlled so that the heating element assumes a value by self-heating such that the bridge voltage is equal to 0 volts. The disadvantage here is among others the temperature coefficient of the measuring bridge to be considered, since the target value for the overtemperature depends on the medium temperature.

Systems with two measuring elements and a separate heating element can be controlled digitally, so that disadvantages of the analog control can be avoided, however, the higher circuit complexity results in an increase of the production costs. Furthermore, the measuring speed in this system is not as fast as in a system with two measuring elements, since the heating field between the heating element and the temperature sensor requires a certain time for its propagation.

SUMMARY

This section provides a general summary of the disclosure, and is not a comprehensive disclosure of its full scope or all of its features.

It is the object of the disclosure to improve the measurement dynamics with a simultaneously decrease of the production costs.

The object is achieved by a flowmeter comprising the features of claim 1 and by a method for operating such a flowmeter according to claim 4. Advantageous embodiments of the disclosure are specified in the respective dependent claims.

According to the disclosure, the second temperature sensor also serves as a heating element and the two temperature sensors are supplied with a measuring current via a respective current source. Based on this, the core of the disclosure is that the two temperature sensors and thus also the heating element are connected to a control unit, which controls the heating power of the heating element so that by means of a timing element, the temperature difference $\Delta T = T_{Heiz} - T_{Medium}$ assumes a predetermined value at a predetermined time $\Delta t_{Mess}$. For this purpose, the control unit provides a square wave signal, preferably a pulse width modulated signal (PWM signal), which is supplied to the second temperature sensor. Thus, the second temperature sensor acts as the heating element in the high phase of the square wave signal and as a temperature sensor—then powered by the separate current source—in the low phase.

The decisive factor is that the temperature difference $\Delta T$ is determined periodically only at the specified time $\Delta t_{Mess}$ after the switch-off edge of the square wave signal. That is, the flowmeter according to the disclosure measures only at a precisely defined time point during the cooling phase, namely comparatively shortly after the beginning of the low or cooling phase.

The control unit compares the measured temperature difference $\Delta T$ with a predetermined value $\Delta T_{Soll}$ and shortens the pulse width of the PWM signal in the case $\Delta T > \Delta T_{Soll}$ so that the second temperature sensor or the heating element is heated for a shorter time, and extends the pulse width of the PWM signal in the case $\Delta T < \Delta T_{Soll}$, so that the second temperature sensor or the heating element is heated for a longer time.

The disclosure can therefore be summarized so that the cooling curve of $\Delta T$ at the time $\Delta t_{Mess}$ should pass through the point $\Delta T_{Soll}$, wherein in this case only the temperature value at the beginning of the cooling curve is decisive. This temperature value at the beginning of the cooling curve is adjusted by the control unit over the duration of the heating phase. The higher the flow velocity, the longer it must be heated, first, because even during the heating phase the heat dissipation is correspondingly greater, but also because the temperature value of $\Delta T$ at the beginning of the cooling phase must be higher in order to achieve that the correspondingly steeper sloping cooling curve passes again through the point $\Delta T_{Soll}$ at the time $\Delta t_{Mess}$. In the opposite case, i.e. for lower flow rates, exactly the opposite applies. Finally, then the duty cycle of the square wave or PWM signal is a measure of the flow rate present.

Because a measurement takes place only at a well-defined time point shortly after the beginning of the cooling phase, i.e. not the entire cooling phase must be awaited, the measurement dynamics of the flowmeter is very high, so that the flowmeter according to the disclosure can even be used in environments with strongly and rapidly fluctuating flow rates.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The disclosure will be described below in more detail based on an exemplary embodiment with reference to the drawings.

Figure 2A:
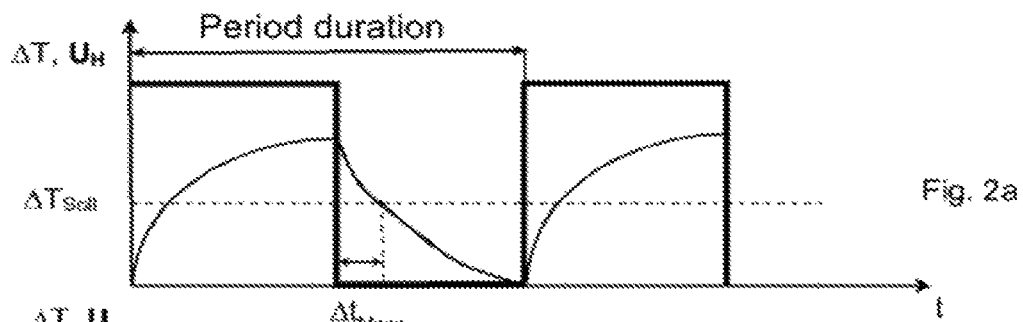
Figure 2B:
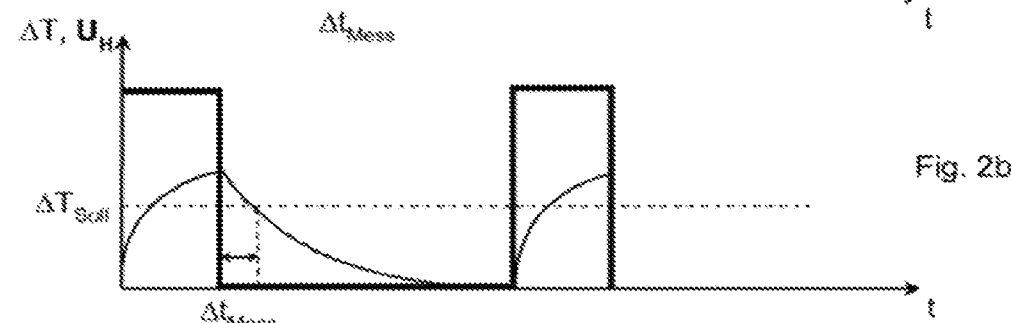
Figure 2C:
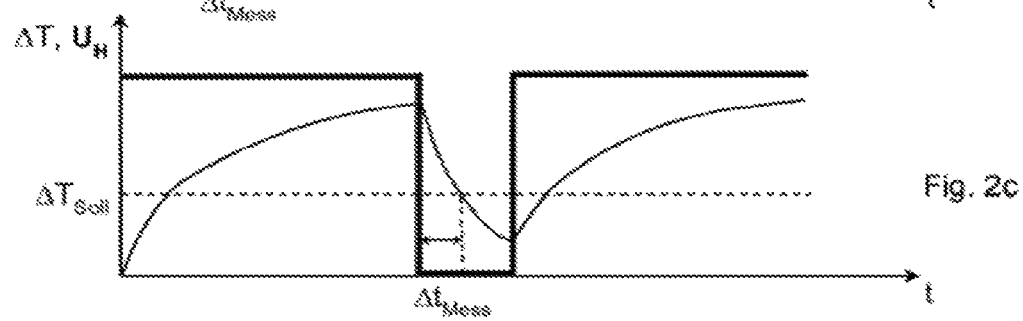

The drawings schematically show:

FIG. 1 a principal circuit structure of a flowmeter according to the disclosure;

FIG. 2 a diagram representing a square wave signal and the corresponding curve of the measured temperature $\Delta T$ in a first scenario;

FIG. 2b a diagram showing a square wave signal and the corresponding curve of the measured temperature $\Delta T$ in a second scenario (lower flow than in FIG. 2a); and FIG. 2c a diagram showing a square wave signal and the corresponding curve of the measured temperature $\Delta T$ in a third scenario (larger flow than in FIG. 2a).

DETAILED DESCRIPTION

Example embodiments will now be described more fully with reference to the accompanying drawings.

In the following description of the preferred embodiments, like reference symbols designate like or similar components.

FIG. 1 shows the principal circuit structure of the flowmeter according to the disclosure, wherein the focus is placed on the illustration of the disclosure and the explanation of measures obvious for a person skilled in the art, such as the supply of the control unit 10, have been omitted.

At the bottom right, the measuring tube 1 is shown, through which the medium to be measured flows. The flow is indicated by the arrow. The two temperature sensors $R_{SM}$ and $R_H$ are disposed within the measuring tube 1 and thus in thermal contact with the medium. The first temperature sensor $R_{SM}$ detects the temperature of the medium in a non-heated region, i.e. in a region which is not affected by the heating element, of the medium as the reference temperature $T_{Medium}$ and the temperature sensor $R_H$ detects the temperature $T_{Heiz}$ of the heating element. Both temperature sensors $R_{SM}$, $R_H$ are advantageously configured as a Pt element, preferably as Pt100.

The system is operated in a pulsed way, i.e. the heating power is provided by the control unit 10 via a square wave signal, in this exemplary embodiment preferably as a PWM signal, at its output 10a. The control unit 10 is in this case preferably configured as a microcontroller.

Here, the temperature sensor $R_H$ is used both for measuring the temperature and for heating the medium, which is to be indicated by the switch 12. By means of the square wave signal, which is supplied to the second temperature sensor $R_H$, the temperature sensor $R_H$ acts as a heating element during the high phase and as a temperature sensor in the low phase. The measuring current required for the temperature detection is provided during this time by the power source 13b. The current source 13a is provided in parallel thereto for the supply of the temperature sensor $R_{SM}$.

The voltage drops across the Pt elements $R_{SM}$ and $R_H$ are supplied to a differential amplifier 14, the output signal $\Delta T$ of which in turn is supplied to the microcontroller 10 at the input 10b. Consequently, $\Delta T$ is determined directly from the measurement of the voltage difference between the two temperature sensors $R_{SM}$ and $R_H$. This requires two similar current sources 13a and 13b, which ensure that low measuring currents of the same magnitude flow through $R_{SM}$ and $R_H$. The determination of the temperature difference $\Delta T$ is thus possible only during the time in which the heating element $R_H$ is not supplied with a high heating current, which was achieved by the measurement of the temperature difference $\Delta T$ at the specified time $\Delta t_{Mess}$ after the switch-off edge of the PWM signal, i.e. in the low phase. The switching between the heating and the measuring operation is realized by the switch 12.

The assignment of the respective duty cycle of the PWM signal to the corresponding flow rate is made via a family of characteristics, which is stored in the microcontroller 10. The temperature dependence of the heat transport properties (substance parameters) of the medium can also be mapped via this family of characteristics and thus compensated. To this end, the voltage drop across the first temperature sensor $R_{SM}$ is amplified by the amplifier 15 and then supplied to the microcontroller 10 at the input 10c where it is used to determine the medium temperature.

In FIG. 2a, the PWM signal (thick line) of the microcontroller 10 and the corresponding curve of the measured temperature difference ΔT (thin line) at an average flow rate can be seen. The following FIGS. 2b and 2c each represent situations in which the flow rate is slower—FIG. 2b—or higher—FIG. 2c. The three PWM signals differ only in their pulse widths or duty cycles, i.e. the ratio between the high and the low phase. In FIG. 2a, the ratio between the high and the low phase should be approximately 1:1, while in FIG. 2b compared to FIG. 2a a significantly shorter pulse width with a correspondingly longer low phase, and in FIG. 2c a significantly longer pulse width with a correspondingly shorter low phase are shown.

The measurement of the temperature difference ΔT always takes place at a certain and predetermined time $\Delta T_{Mess}$ after the switch-off edge of the PWM signal, i.e. from the beginning of the low phase. Thus, the system attempts to measure a predetermined overtemperature $\Delta T_{Soll}$ at this time point $\Delta t_{Mess}$. This could, for example, be at 2K. With slow temperature sensors, the period can be several seconds and $\Delta t_{Mess}$ a few milliseconds. For very fast temperature sensors, the period can be reduced to a few milliseconds and also $\Delta t_{Mess}$ can be shortened accordingly.

If, starting from the scenario in FIG. 2 a, the flow rate decreases, this would initially lead to an excess heating of the heating element $R_H$ because of the lower heat dissipation, so that after the switch-off edge the starting temperature for the cooling phase is too high to reach the expected overtemperature $\Delta T_{Soll}$ of, for example 2K, at the time $\Delta t_{Mess}$. Indeed, at the time $\Delta t_{Mess}$ the expected overtemperature $\Delta T_{Soll}$ is initially exceeded. The microcontroller 10 recognizes this difference and readjusts the heating voltage $U_H$ accordingly by reducing the pulse width and thus the heating time. As a result of this the heating element, now energized for a shorter duration, heats the medium to a lower extent, so that the starting temperature for the cooling phase is now lower. The microcontroller 10 repeats these steps until the pulse width set by it, that is the heating time, causes that at the time $\Delta t_{Mess}$ the expected overtemperature $\Delta T_{Soll}$ of, for example 2 K, is measured again. This condition is illustrated in FIG. 2b.

If, starting from the scenario in FIG. 2a, the flow rate increases, this would initially cause that the heating element $R_H$ is heated insufficiently because of the greater heat dissipation, so that after the switch-off edge the starting temperature for the cooling phase is too low to reach the expected overtemperature $\Delta T_{Soll}$ of, for example 2K, at the time $\Delta t_{Mess}$. At the time $\Delta t_{Mess}$ the expected overtemperature $\Delta T_{Soll}$ is initially undercut. The microcontroller 10 recognizes this difference and readjusts the heating voltage $U_H$ accordingly by extending the pulse width and thus the heating time. The heating element, now energized for a longer duration, heats the medium as a result to a higher temperature, so that the starting temperature for the cooling phase is now higher. The microcontroller 10 repeats these steps until the pulse width set by it, that is to say the heating time, results in that the expected overtemperature $\Delta t_{Soll}$ is measured again at the time $\Delta t_{Mess}$. This condition is illustrated in FIG. 2c.

The duration of the heating phase, i.e. the duty cycle of the PWM signal, and thus the consumed heating power is ultimately a measure of the flow rate.

The advantage of this flowmeter is, inter alia, that it can be used universally for various media, since only a software adjustment of the microcontroller 10 is necessary for an adaptation. Furthermore, there is a lower power loss of the circuit through the PWM operation. In summary, by means of the disclosure a higher measurement dynamics can be achieved, i.e. a higher measurement speed and an improved linearization of the characteristics.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A thermal flowmeter for use in the process measuring technology at non-constant medium temperatures, comprising a heating element which is thermally coupled to the flowing medium and thus transfers its heating power to the flowing medium, and two temperature sensors ($R_{SM}$, $R_H$), which are supplied with a measuring current via a respective current source, wherein a first temperature sensor ($R_{SM}$) detects the temperature of the medium in a region of the heating medium that is not affected by the heating element as a reference temperature $T_{Medium}$ and a second temperature sensor ($R_H$) detects the temperature $T_{Heiz}$ of the heating element, wherein the second temperature sensor ($R_H$) also serves as the heating element, wherein the two temperature sensors ($R_{SM}$, $R_H$) and, thus, also the heating element ($R_H$) are connected to a control unit, which provides a square wave signal which is supplied to the second temperature sensor ($R_H$) so that in the high phase it acts as a heating element and in the low phase as a temperature sensor, wherein the control unit controls the heating power of the heating element formed by the second temperature sensor ($R_H$) so that by means of a timing element the temperature difference $\Delta T = T_{Heiz} - T_{Medium}$ assumes a predetermined value at a predetermined time $\Delta t_{Mess}$ after the switch-off edge of the square wave signal, and wherein for controlling a duty cycle of the square wave signal, which is a measure of the flow rate of the flowing medium, the control unit is arranged to shorten the pulse width of the square wave signal in the case $\Delta T > \Delta T_{Soll}$ so that the second temperature sensor ($R_H$) is heated for a shorter time, and to extend the pulse width of the square wave signal in the case $\Delta T < \Delta T_{Soll}$, so that the second temperature sensor ($R_H$) is heated for a longer time.

2. The flowmeter according to claim 1, wherein the control unit is configured as a microcontroller.

3. The flowmeter according to claim 2, wherein the square wave signal is configured as a PWM signal (pulse width modulated signal).

4. The flowmeter according to claim 1, wherein the square wave signal is configured as a PWM signal (pulse width modulated signal).

5. The flowmeter according to claim 1, wherein the temperature difference ΔT is determined directly from the measurements of a voltage difference of the two temperature sensors ($R_{SM}$, $R_H$) by means of a differential amplifier and supplied to the control unit.

6. A method for operating a thermal flowmeter for application in the process measuring technology at non-constant medium temperatures, comprising a heating element which is thermally coupled to the flowing medium and thus transmits its heating power to the flowing medium, and two temperature sensors ($R_{SM}$, $R_H$), which are supplied with a measuring current via respective current sources, wherein a first temperature sensor ($R_{SM}$) detects the temperature of the medium $T_{Medium}$ in a region of the medium that is not affected by the heating element as a reference temperature $T_{Medium}$ and a second temperature sensor ($R_H$) detects the temperature $T_{Heiz}$ of the heating element, wherein the second temperature sensor ($R_H$) also serves as the heating element, wherein both temperature sensors ($R_{SM}$, $R_H$) and, thus, also the heating element ($R_H$) are connected to a control unit, which provides a square wave signal which is supplied to the second temperature sensor ($R_H$) and controls the heating power of the heating element ($R_H$) so that by means of a timing element the temperature difference $\Delta T = T_{Heiz} - T_{Medium}$ assumes a predetermined value at a predetermined time $\Delta t_{Mess}$ after the switch-off edge of the square wave signal, wherein the temperature difference $\Delta T$ is determined periodically only at the specified time point $\Delta t_{Mess}$ after the switch-off edge of the square wave signal, wherein the control unit compares the measured temperature difference $\Delta T$ with a predetermined value $\Delta T_{Soll}$, wherein for controlling a duty cycle of the square wave signal, which is a measure of the flow rate of the flowing medium the control unit in the case $\Delta T > \Delta T_{Soll}$ shortens the pulse width of the square wave signal so that the second temperature sensor ($R_H$) is heated for a shorter time, and extends the pulse width of the square wave signal in the case $\Delta T < \Delta T_{Soll}$ the pulse width of, so that the second temperature sensor ($R_H$) is heated for a longer time.

7. The method according to claim 6, wherein the control unit is configured as a microcontroller.

8. The method according to claim 7, wherein the square wave signal is configured as a PWM signal (pulse width modulated signal).

9. The method according to claim 7, wherein the temperature difference $\Delta T$ is determined directly from the measurements of a voltage difference of the two temperature sensors ($R_{SM}$, $R_H$) and supplied to the control unit.

10. The method according to claim 6, wherein the square wave signal is configured as a PWM signal (pulse width modulated signal).

* * * * *